United States Patent [19]
Wober et al.

[11] Patent Number: 6,151,420
[45] Date of Patent: *Nov. 21, 2000

[54] MINIMIZING BLOCKING ARTIFACTS IN A FILTERED IMAGE

[75] Inventors: Munib A. Wober, Haverhill; Ibrahim Hajjahmad, Sommerville, both of Mass.

[73] Assignee: Polaroid Corporation, Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/573,504

[22] Filed: Dec. 15, 1995

[51] Int. Cl.$^7$ ...................................................... G06K 9/40
[52] U.S. Cl. ........................................... 382/275; 382/232
[58] Field of Search ................................. 382/232, 233, 382/275; 358/432, 433; 348/403

[56] References Cited

U.S. PATENT DOCUMENTS

| | | | |
|---|---|---|---|
| 5,168,375 | 12/1992 | Reisch et al. | 358/432 |
| 5,235,434 | 8/1993 | Wober | 382/272 |
| 5,454,051 | 9/1995 | Smith | 382/233 |
| 5,563,718 | 10/1996 | Wober et al. | 358/433 |
| 5,729,631 | 3/1998 | Wober et al. | 382/232 |
| 5,740,284 | 4/1998 | Wober et al. | 382/250 |

OTHER PUBLICATIONS

Wober et al.; U.S. Patent Application No. 08/440,639.
Wober et al.; U.S. Patent Application No. 08/427,457.
Hajjahmad et al.; U.S. Patent Application No. 08/441,383.

*Primary Examiner*—Jose L. Couso
*Assistant Examiner*—Anh Hong Do
*Attorney, Agent, or Firm*—Robert J. Decker

[57] ABSTRACT

In order to prevent or minimize blocking artifacts from appearing in an image due to independent processing of each overlapped block of an image by one of many different filters, true pixel correction values are calculated, then added to each pixel of the image so that the transition between adjacent blocks of pixels will be smooth. This corrective method coined "stitching" is applied in either the spatial or the frequency domain to each block of filtered pixels in the image and generally includes the steps of:

(i) choosing measurement points within a given block, so that the measurement points reside in areas overlapped by adjacent blocks and are situated in between pixels which have been saved (the saved region) and pixels which have been discarded during filtering;

(ii) determining measurement point values at each measurement point by pixel measurement or approximation from neighboring pixels, as necessary;

(iii) calculating measurement point correction values which will be non-zero when the measurement points are situated between pixels;

(iv) calculating true pixel correction values for pixels situated in the saved region by interpolating between the measurement point correction values; and (v) modifying pixel values within the saved region in accordance with the true pixel correction values, respectively.

14 Claims, 13 Drawing Sheets

MINIMIZING BLOCKING ARTIFACTS IN A FILTERED IMAGE

BACKGROUND OF THE INVENTION

1. Field of the Invention

The invention relates generally to an improved method and apparatus for digital image processing. More particularly, the invention relates to a novel method and apparatus for removing or at least minimizing blocking artifacts perceptible in a block processed image.

2. Description of the Prior Art

A scene can be perceived as some visual reality that is distributed in space and/or time. Ordinarily, a scene is what the human visual system perceives as variations in light-dependent stimuli such as brightness, contrast, color and depth cues.

A scene can be captured by an electronic imaging device and represented as a multi-dimensional digitized image of picture elements, i.e. pixels. The image can be displayed in many different ways, e.g. a photograph, on a computer monitor, etc. The image is composed of various parts which represent scene characteristics. For instance, a color photograph of a scene is typically a collection of red, green, blue and luminance images of the same scene.

An image can be electronically processed by segmentation into M×N blocks of pixels, where M and N are preselected integers. This is done to provide compatibility of the block sizes with the processing limitations of commercially available chips. For instance, 8×8 blocks conform to international compression standards set by JPEG (Joint Photographic Experts Group) and MPEG (Motion Picture Experts Group).

Block processing is utilized by many known processing routines, such as the one taught in U.S. patent application Ser. No. 08/440,639 filed May 15, 1995 by the present inventors and others, incorporated herein by reference. There, a pyramid image representation of the image is segmented into M×N overlapped blocks, and subjected to a variant Wiener filter.

The above and other methods of digital image processing, which are based on block processing, sometimes exhibit visible blocking artifacts due to discontinuities in the block boundaries of a reproduced image. One type of image discontinuity comes from independent processing (e.g. filtering) of each block which causes images that can be visually unpleasant to human observers who tend to see the discontinuities as artificial tiling. The overall quality of the observed image drops dramatically.

The blocking artifacts problem can sometimes be adequately dealt with by overlapping adjacent pixel blocks in both the horizontal and vertical directions. For instance, FIG. 2 shows a portion of an image containing 144 pixels which is segmented into M×N blocks 200 and 210 where M=N=8. Notice that block 210 overlaps block 200 by 4 pixels in the horizontal direction, i.e. the horizontal overlapping coefficient $k_h$=4. Of course, the size of the blocks and the amount of overlap between blocks can be selected to meet whatever design criteria is specified. In this case, filtering of each overlapped block yields a 4×4 section of filtered pixels for each block as shown by the crosshatched regions. The remaining 2 pixel wide perimeter of each 8×8 block is discarded. Further details concerning the overlapping of adjacent pixel blocks is disclosed in U.S. patent application Ser. No. 08/427,457 filed Apr. 24, 1995 by Wober & Reisch (see particularly FIG. 7 and the accompanying text on pages 32–33 which are incorporated herein by reference).

When each block is processed in a different manner, such as being filtered differently from an adjacent block, the discontinuities evident from independent processing sometimes cannot be overcome by any amount of overlapping. For instance in the variant Wiener filtering method mentioned above, each overlapped block at each pyramid level is independently filtered with one of many predetermined variant Wiener filters, which may result in the appearance of unacceptable blocking artifacts along the borders of adjacent blocks.

U.S. Pat. No. 5,454,051 issued Sept. 26, 1995 to Smith discloses a method of reducing blocking artifacts created by block transform compression algorithms by applying a variable lowpass filter (blur) operation on block boundaries that is based on the frequency coefficients of the transformed data. However, several limitations are evident in the Smith method. First, his method is applicable only to unoverlapped blocks. Second, his method processes each side of a block individually. Third, his corrections are determined only in the frequency domain. And fourth, his method uses a two point filter limited to blurring only boundary pixels.

Consequently, the primary object of the present invention is to overcome the above and other problems by providing an improved method and system for removing or at least minimizing blocking artifacts in an image subsequent to independent processing of each block. This and other objects of the invention will, in part, appear hereinafter and, in part, be obvious when the following detailed description is read in conjunction with the drawings.

SUMMARY OF THE INVENTION

In order to prevent or minimize blocking artifacts from appearing in an image due to independent processing of each overlapped block of an image by one of many different filters, true pixel correction values are calculated, then added to each pixel of the image so that the transition between adjacent blocks of pixels will be smooth. This corrective method coined "stitching" can be applied in either the spatial or the frequency domain to each block of filtered pixels in the image and generally includes the steps of;

(i) choosing measurement points within a given block, so that the measurement points reside in areas overlapped by adjacent blocks and are situated in between pixels which have been saved (i.e. the saved region) and pixels which have been discarded during filtering;

(i) determining measurement point values at each measurement point by pixel measurement or approximation from neighboring pixels, as necessary;

(ii) calculating measurement point correction values which will be non-zero when the measurement points are situated between pixels;

(iv) calculating true pixel correction values for pixels situated in the saved region by interpolating between the measurement point correction values; and (v) modifying pixel values within the saved region in accordance with the true pixel correction values, respectively.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

The following description is provided to enable any person of ordinary skill in the art of digital image processing to make and use the present invention. It sets forth the best modes contemplated by the inventors for carrying out their invention. Various modifications, however, will remain readily apparent to those skilled in the art in keeping with the scope of the invention as claimed.

In both the following one-dimensional and two-dimensional preferred embodiments, the inventive stitching method is applied to blocks of pixels which have been subjected to the variant Wiener filtering of U.S. patent application Ser. No. 08/440,639 as shown in FIG. 1. The inventive stitching method eliminates or at least minimizes blocking artifacts which occurs from independent processing of each block in an image.

The following examples in one and two dimensions could readily be applied by those skilled in the art to any number of dimensions in any system or method which causes or exacerbates blocking artifacts due to independent processing of blocks.

Figure 1A:
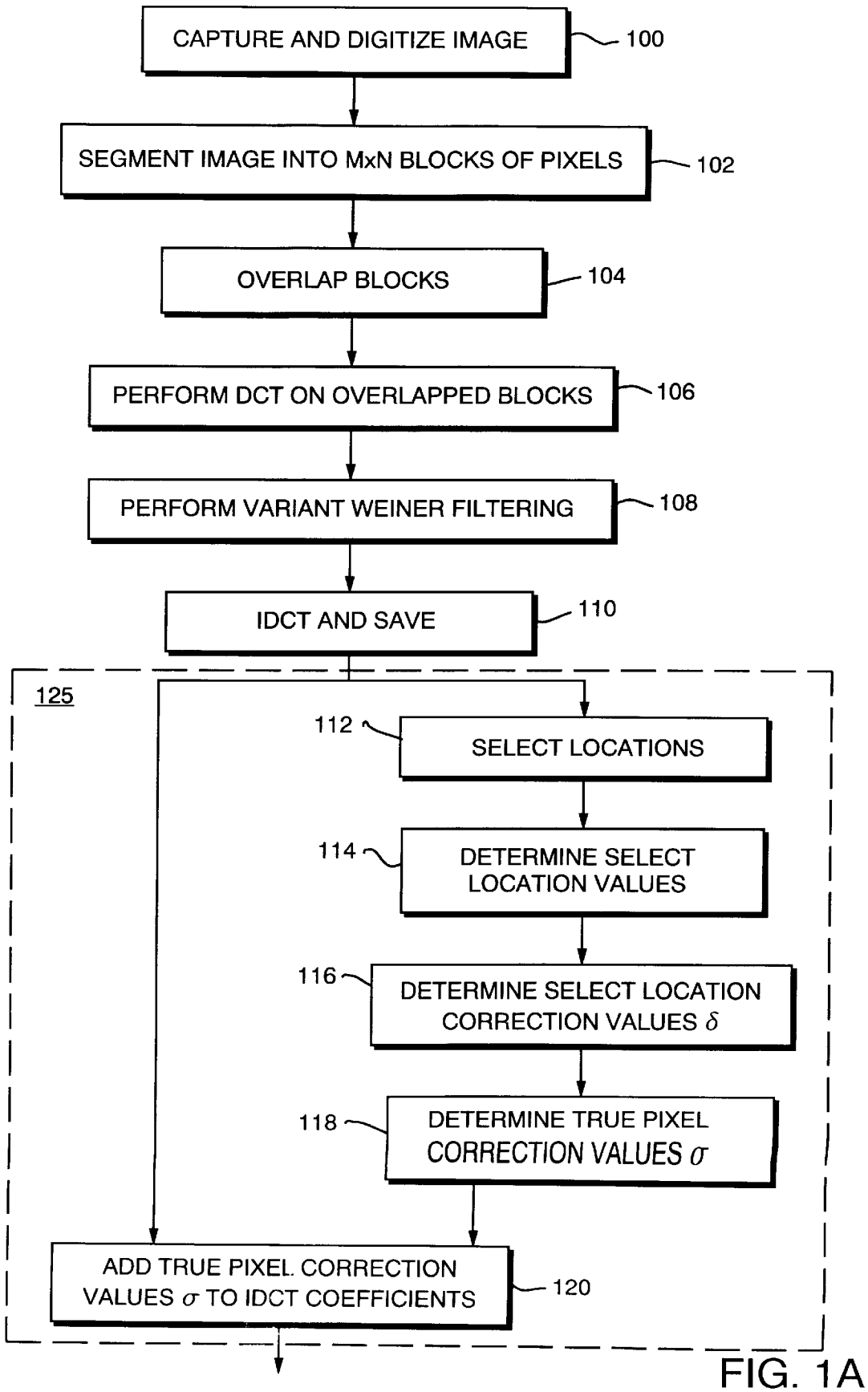
FIG. 1A is a block diagram of a first variation preferred embodiment of the inventive method applied to a system using variant Wiener noise filtering.
Figure 3:
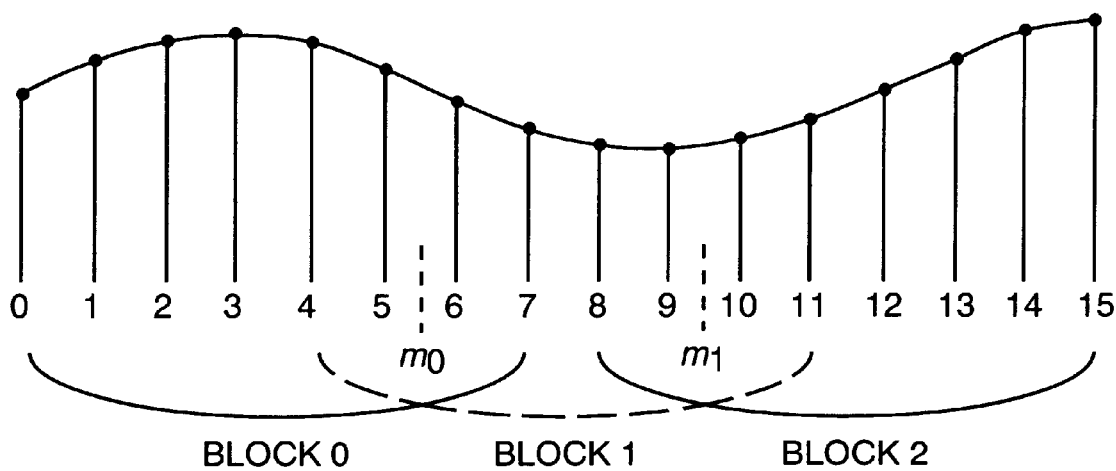
FIG. 3 is a graphical representation of a sixteen point one-dimensional segment of an image.

Following FIG. 1A, a one-dimensional image, such as the 16 point segment shown in FIG. 3, is captured and digitized in step 100. The image is then saved and segmented into M×N blocks of pixels in step 102 where M=8 and N=1. Adjacent pixel blocks are horizontally overlapped according to the predetermined overlapping coefficient $k_h$=4 in step 104. The amount of overlap is determined to meet desired visual effects. Since the image blocks of interest are one-dimensional, the vertical overlapping coefficient $k_v$=0. Block 0 consists of points 0–7, block 1 consists of points 4–11, and block 2 consists of points 8–15. The overlapped region between blocks 0 and 1 consists of points 4, 5, 6 and 7; and the overlapped region between blocks 1 and 2 consists of points 8, 9, 10 and 11.

M×N blocks of discrete cosine transform (DCT) coefficients corresponding to the M×N blocks of pixels are generated in step 106 by performing a DCT on the overlapped blocks of pixels.

Variant Wiener filtering of each block of DCT coefficients is performed in step 108 to generate corresponding blocks of filtered DCT coefficients. Further details of the variant Wiener filtering method are outlined in the inventors' earlier filed U.S. patent application Ser. No. 08/440,639 incorporated herein by reference in its entirety. Of course, the use of a variant Wiener filter is illustrated only as one preferred embodiment. It is not necessary in the operation of the inventive stitching method. Any independently filtered blocks of image data resident in either the spatial or frequency domain can be input into the inventive stitching routine 125.

Continuing with the example of FIG. 1A, the next step in the variant Wiener filtering method is to generate inverse discrete cosine transform (IDCT) coefficients in block 110 by taking an IDCT of the blocks of filtered DCT coefficients, then saving selected portions of the inverted blocks, i.e. the saved region, corresponding to the pixels which have been filtered. Use of a pruned scaled IDCT eliminates redundant terms introduced by the overlapping procedure and correspondingly reduces the computational resources required for derivation of a filtered image data matrix. The details concerning the operation and application of the pruned scaled IDCT are incorporated herein by reference as described in U.S. patent application Ser. No. 08/441,383 filed May 15, 1995 by Hajjahmad and Wober. The saved IDCT coefficients are then sent to a display or other output device for reproduction of the original image which has been filtered. However as earlier noted, the reproduced image could possibly exhibit blocking artifacts due to the independent application in the variant Wiener filtering method of various filters to the many blocks of the segmented image.

Figure 4A:
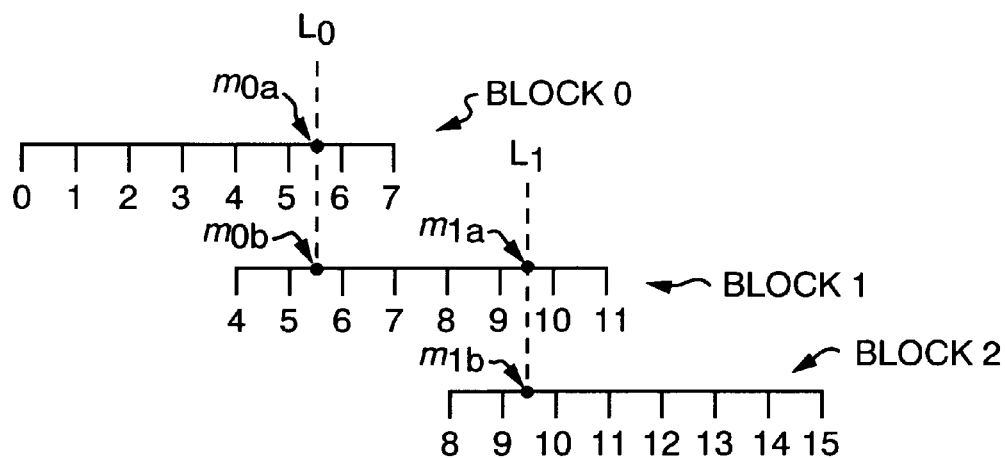
FIG. 4A is a graphical representation of the sixteen point one-dimensional segment of FIG. 3 broken into three 8-point blocks with a four point overlap.
Figure 4B:
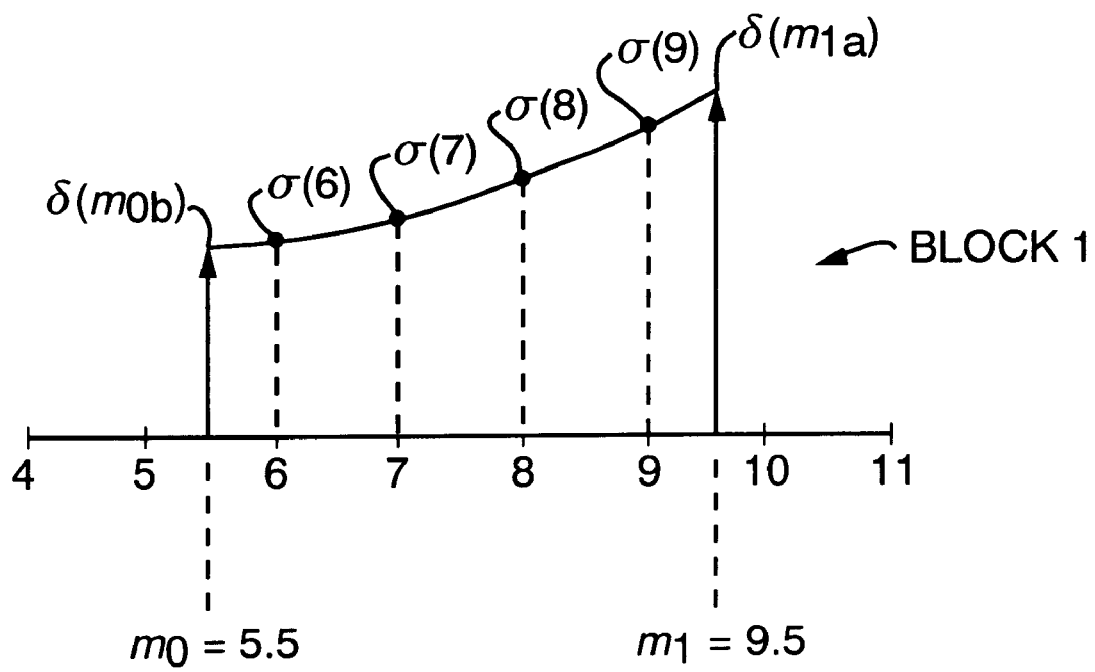
FIG. 4B is a graphical representation of the measurement point correction values δ and true pixel correction values a featured in an 8 point image segment.

As will be explained in more detail to follow, the above problem concerning blocking artifacts is overcome according to the inventive stitching method by calculating, then adding a true pixel correction value to each pixel in the image so that the transition between adjacent overlapped blocks of image data will be smooth. Stitching is applied to each block of filtered image data in the image and generally includes the steps of;

(i) choosing measurement points within a given block, so that the measurement points reside in areas overlapped by adjacent blocks and are situated in between pixels which have been saved in the saved region and pixels which have been discarded during filtering;

(ii) determining measurement point values at each measurement point by pixel measurement or approximation from neighboring pixels, as necessary;

(iii) calculating measurement point correction values which will be non-zero when the measurement points are situated between pixels;

(iv) calculating true pixel correction values for pixels situated in the saved region by interpolating between the measurement point correction values; and (v) modifying pixel values within the saved region in accordance with the true pixel correction values, respectively. The stitching routine 125 begins in step 112 where measurement points are chosen according to the amount of overlap desired. In the current example a horizontal overlapping coefficient of $k_h=4$ is used for 8 point blocks as shown in FIGS. 3, 4A and 4B. The blocks have been previously filtered, saving the central four pixels and discarding a two pixel wide perimeter for each block. An ideal measurement point would fall between the saved and discarded pixels. Since pixels 6, 7, 8 and 9 are saved in block 1 and pixels 4, 5, 10 and 11 are discarded, ideal measurement points $m_0=5.5$ and $m_1=9.5$ are chosen as shown in FIG. 3.

Actually, the measurement points are defined as preselected points within a block where measurement point correction values will be determined. In rare cases, the measurement point may be chosen to fall on a pixel, whereupon measurement point values can be directly measured. More typically, however, the measurement points are chosen to fall between pixels so that the measurement point values are determined by approximation from neighboring pixels using any known approximation method (such as bilinear interpolation of neighboring pixel values). At each measurement point $m_0$ and $m_1$ two calculations are made in step 114—one calculation for each block overlapping each measurement point. Block 0 overlaps block 1 at points 4, 5, 6, 7 and block 2 overlaps block 1 at 8, 9, 10, 11. Corresponding to measurement point $m_0$ is $m_{0a}$ in block 0 and $m_{0b}$ in block 1. Corresponding to measurement point $m_1$ is $m_{1a}$ in block 1 and $m_{1b}$ in block 2. The measurement points for the stitching method must be chosen to be conterminous between adjacent blocks. In the present case, measurement point $m_0$ is located at 5.5 for both blocks 0 and 1 and measurement point $m_1$ is located at 9.5 for both blocks 1 and 2. Each calculation of a measurement point value can generally be made by either direct measurement, if the measurement point is chosen on a pixel, or by interpolation or other known estimation techniques if the measurement point is chosen to fall between pixels. In this case, since measurement point $m_0$ has been chosen between pixels at 5.5, then the measurement point value $m_{0a}$ corresponding to block 0 along line $L_0$ can be determined by interpolation from neighboring pixels, such as pixels 5 and 6 in block 0. The measurement point value $m_{0b}$ corresponding to block 1 along line $L_0$ is similarly determined by interpolating values of pixels 5 and 6 in block 1. In a like fashion along line $L_1$, a measurement point value $m_{1a}$ is determined corresponding to block 1, and a measurement point value $m_{1b}$ is determined corresponding to block 2. Similar calculations occur for each block of the image.

The accumulation of measurement point values throughout the image can be arranged in corresponding arrays $|m_a|$ and $|m_b|$ for this one-dimensional example where the array of mean values $|M|$ is calculated as $$|M| = \frac{|m_a| + |m_b|}{2} \qquad (1)$$

where $|m_a|$ and $|m_b|$ are the arrays of all the measurement point values and $|M|$ is the array of all the mean values of the corresponding measurement point values.

Measurement point correction values $\delta(m_a)$ and $\delta(m_b)$ are next calculated in step 116 for each measurement point $m_0$, $m_1$ and stored in arrays so that $|\delta(m_0)|=|M_0|-|m_{0a}|$ and $|\delta(m_{0b})|=|M_0|-|m_{0b}|$. When processing block 1, $\delta(m_{0a})$ represents the measurement point correction value associated with block 0 at $m_0$; and $\delta(m_{0b})$ represents the measurement point correction value associated with block 1 at $m_0$ (see FIGS. 4A and 4B). Similarly, $\delta(m_{1a})$ represents the measurement point correction value associated with block 1 at $m_1$; and $\delta(m_{1b})$ represents the measurement point correction value associated with block 2 at $m_1$. Note that in order to produce symmetrical correction values from each block, $\delta(m_{1a})$ and $\delta(m_{1b})$ relating to a particular measurement point have equal magnitude and opposite signs. In the same manner as described above for block 0, the measurement point correction values $\delta(m_{0b})$ and $\delta(m_{1a})$ associated with block 1, are shown in FIG. 4B at measurement points $m_0=5.5$ and $m_1=9.5$, respectively.

If two measurement point values of adjacent blocks along a same line (e.g. $m_{1a}$ and $m_{1b}$ along $L_1$ as shown in FIG. 4A) are identical or very close in value, then no discontinuity is evident between the blocks and it is easy to show that the corresponding measurement point correction values $\delta(m_a)$ and $\delta(m_b)$ will be zero or very close to zero.

Logically, if the two measurement point values are disparate, it is likely that a block discontinuity exists between the two adjacent blocks (in this case block 0 and block 1), resulting in the absolute value of one or both of the measurement point correction values $\delta(m_a)$, $\delta(m_b)$ being substantially greater than zero.

Once the measurement point correction values $\delta(m_{0a})$, $\delta(m_{0b})$, $\delta(m_{1a})$ and $\delta(m_{1b})$ are determined during processing, then a second set of correction values, termed the true pixel correction values, can be determined from interpolation of the measurement point correction values for each pixel location in the saved region, i.e. pixel locations 6, 7, 8 and 9. The true pixel correction values are designated as $\sigma(i)$ and are calculated in step 118, i being an integer ranging from 6 to 9. In the preferred method, the true pixel correction values $\sigma(i)$, are calculated for the pixels in the saved region (in this case, for i=6, 7, 8 and 9), and the other pixels within the block are discarded. However, true pixel correction values at every pixel in a block can be calculated if desired. In FIG. 4B the true pixel correction values $\sigma(i)$, for pixels located within the saved region of block 1, are estimated by interpolation from the surrounding measurement point correction values $\delta(m_{0b})$ and $\delta(m_{1a})$. Any known interpolation method can be applied. Once the true pixel correction values $\sigma(i)$ have been determined for each pixel of interest, then the true pixel correction values $\sigma(i)$ are added in step 120 to the respective IDCT coefficients which have been determined and saved in step 110. In other words, the true pixel correction values $\sigma(i)$ for i=6 to 9 are added, respectively, to pixel locations 6, 7, 8 and 9 in step 120 to provide adjusted pixel values which will provide a smooth transition between adjacent blocks in the image, thus emancipating the image of blocking artifacts, without compromising the integrity of the image. When this procedure is carried out on every block of the image, the resulting output from step 120 is a final set of pixels which represents the filtered image free from blocking artifacts.

Figure 1B:
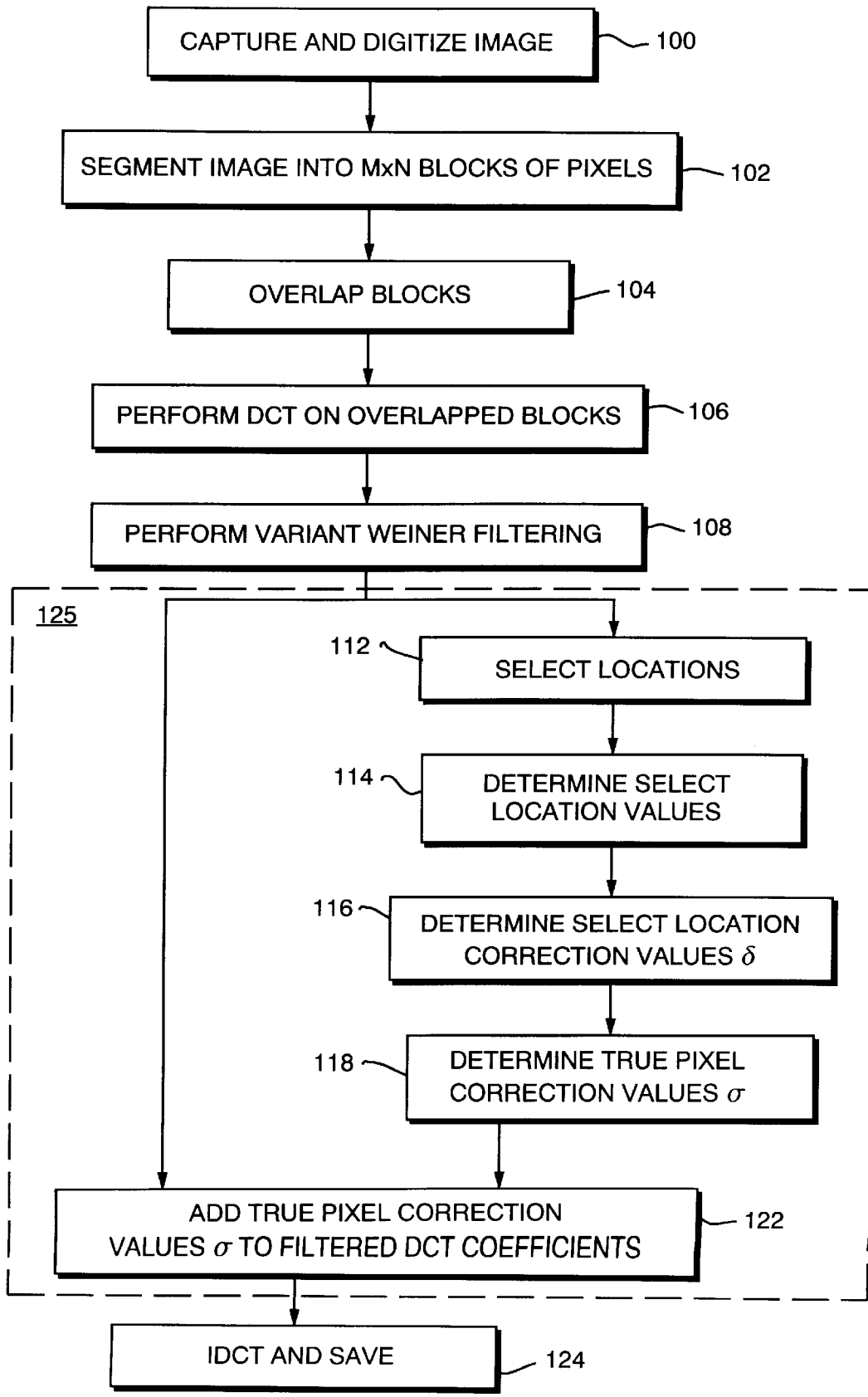
FIG. 1B is a block diagram of a second variation preferred embodiment of the inventive method applied to a system using variant Wiener noise filtering.
Figure 2:
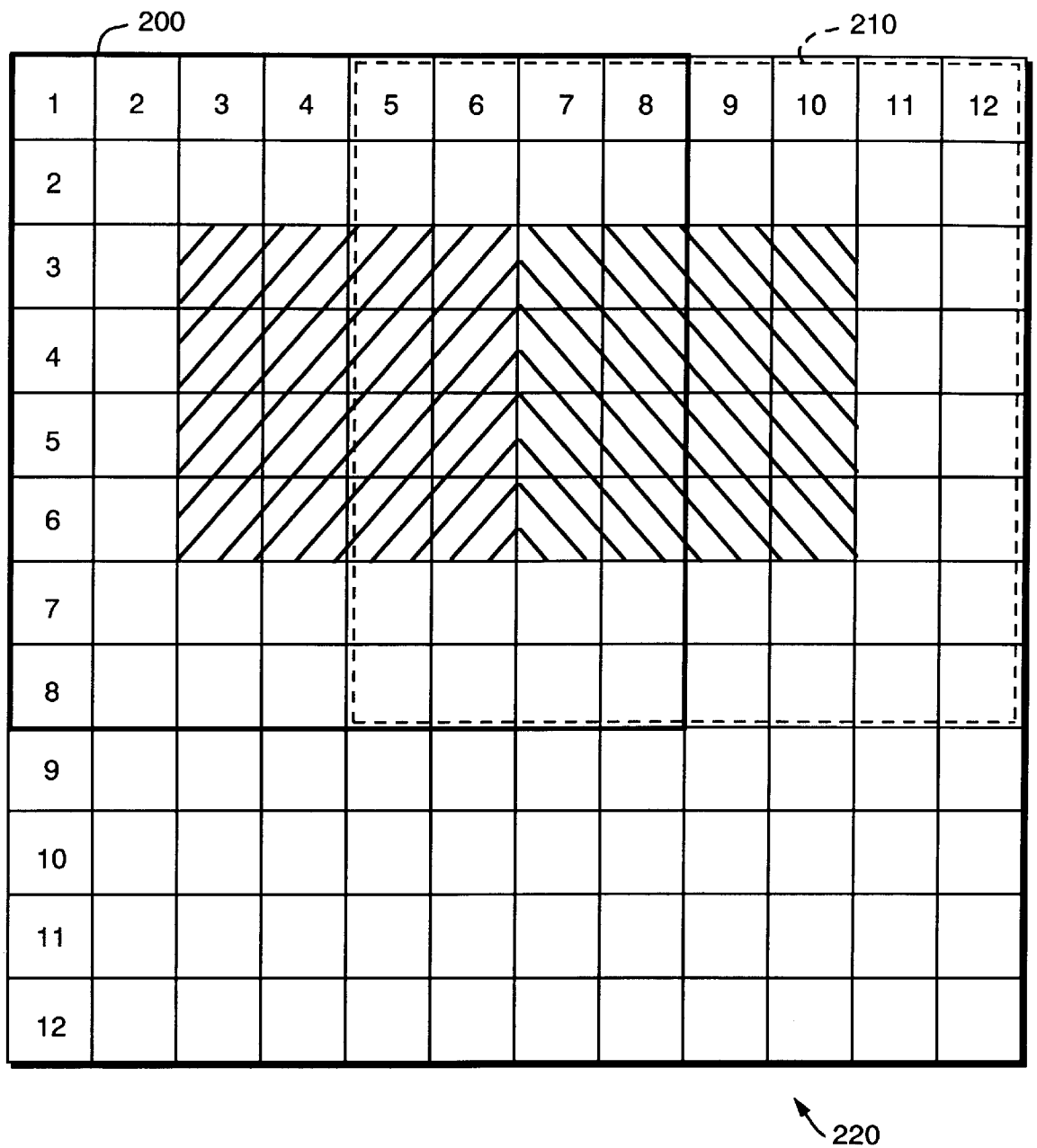
FIG. 2 is a diagrammatic representation of two overlapped 8×8 blocks of image data.

It should be noted that the above described steps of the stitching method are equally applicable to processing correction values in the frequency domain. FIG. 1B is identical to FIG. 1A except that in FIG. 1B the stitching routine is applied in the DCT domain, and the IDCT step 124 converts the results back into the spatial domain.

Figure 5:
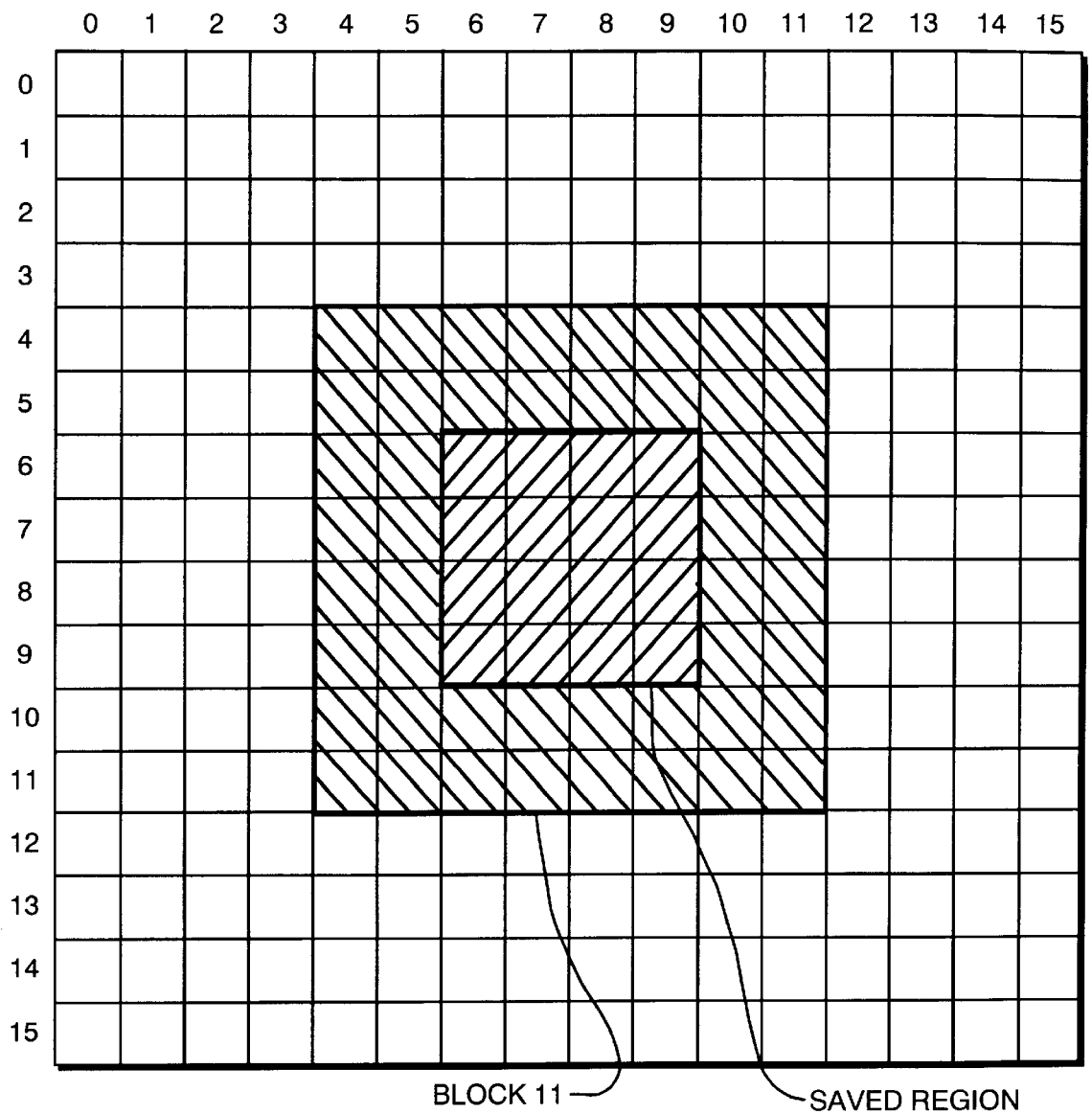
FIG. 5 is a diagrammatic representation showing the saved and discarded regions of an 8×8 pixel block 11 in a 16×16 pixel image segment.

The above-described one-dimensional application of stitching can also be readily extended towards removing blocking artifacts in multiple dimensions. The following example of a preferred stitching method is applied to the 16×16 pixel image segment that is shown in FIG. 5. The one-dimensional image segment (block 1 as shown in FIG. 4 and described in the above example) is replaced with the two-dimensional image segment block 11 shown in FIG. 5. The saved region of pixels {6, 7, 8, 9} in the one-dimensional example is replaced in the two-dimensional example with a saved region where both x and y are evaluated at integer pixel values of {6, 7, 8, 9}.

Figure 6:
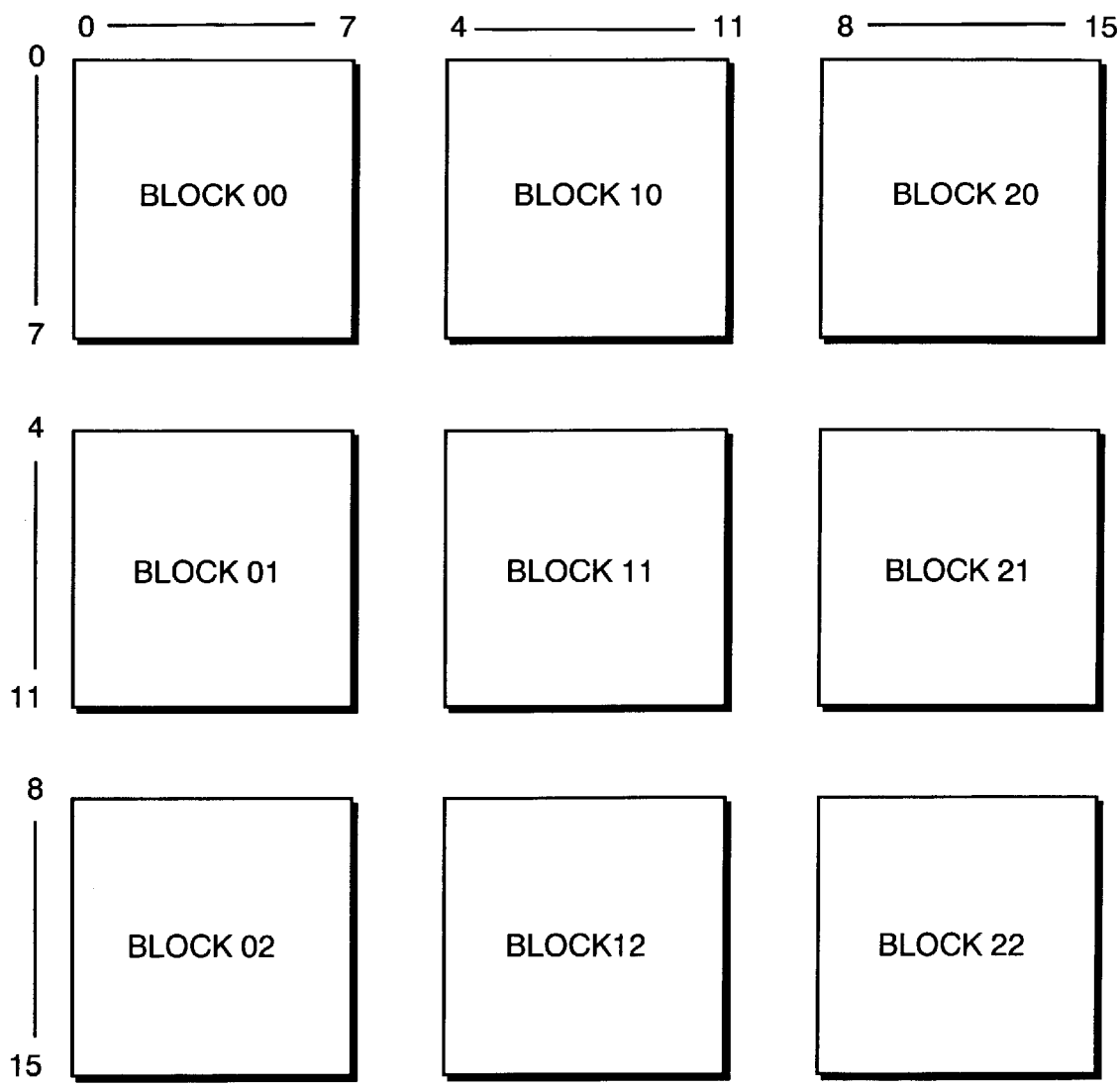
FIG. 6 is a diagrammatic representation of all of the 8×8 pixel blocks which overlap block 11 in the image segment of FIG. 5.

Block 11 will be overlapped during the filtering process of step 108 (see FIG. 1) in each direction by adjacent 8×8 blocks of pixels. The breakdown of all the blocks involved in the processing of block 11 is shown in FIG. 6. Each one of blocks 00, 10, 20, 01, 21, 02, 12, and 22 will overlap block 11. In this example, the horizontal and vertical overlap are equal so that the horizontal overlapping coefficient $k_h$ equals the vertical overlapping coefficient $k_v$, i.e. $k_h=k_v=4$. The overlap of block 00 occurs at pixels x={4, 5, 6, 7} and y={4, 5, 6, 7}. The overlap of block 10 occurs at pixels x={4, 5, 6, 7, 8, 9, 10, 11} and y={4, 5, 6, 7}. The overlap of block 01 occurs at pixels x={8, 9, 10, 11} and y={4, 5, 6, 7}. The overlap of block 01 occurs at pixels x={4,5,6, 7} and y={4, 5, 6, 7, 8, 9, 10, 11}. The overlap of block 21 occurs at x={8, 9, 10, 11} and y={4, 5, 6, 7, 8, 9, 10, 11}. The overlap of block 02 occurs at x={4, 5, 6, 7) and y={8, 9, 10, 11}. The overlap of block 12 occurs at x={4, 5, 6, 7, 8, 9, 10, 11} and y={8, 9, 10, 11}. The overlap of block 22 occurs at x=(8, 9, 10, 11} and y={8, 9, 10, 11}.

Figure 7A:
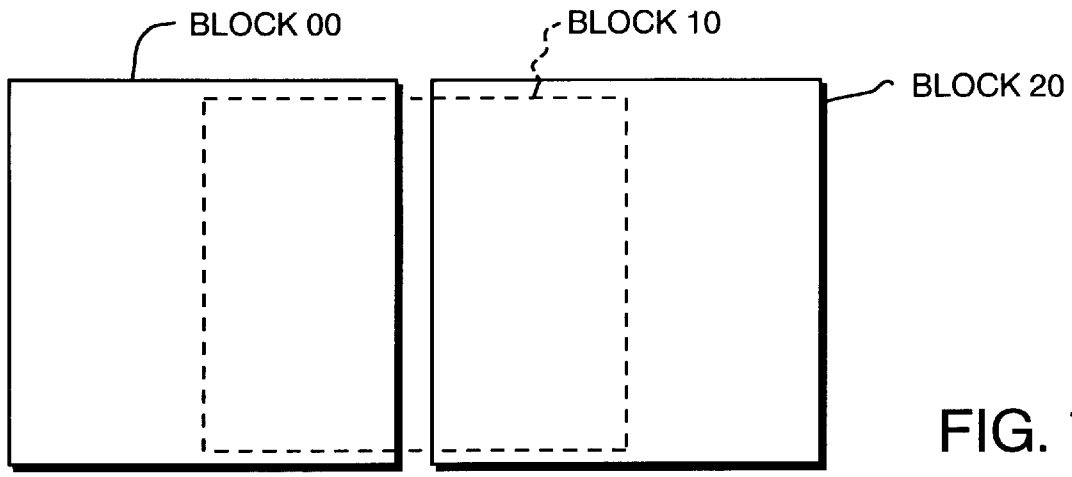
FIGS. 7A, 7B and 7C illustrate horizontal overlapping of blocks from FIG. 6.
Figure 7B:
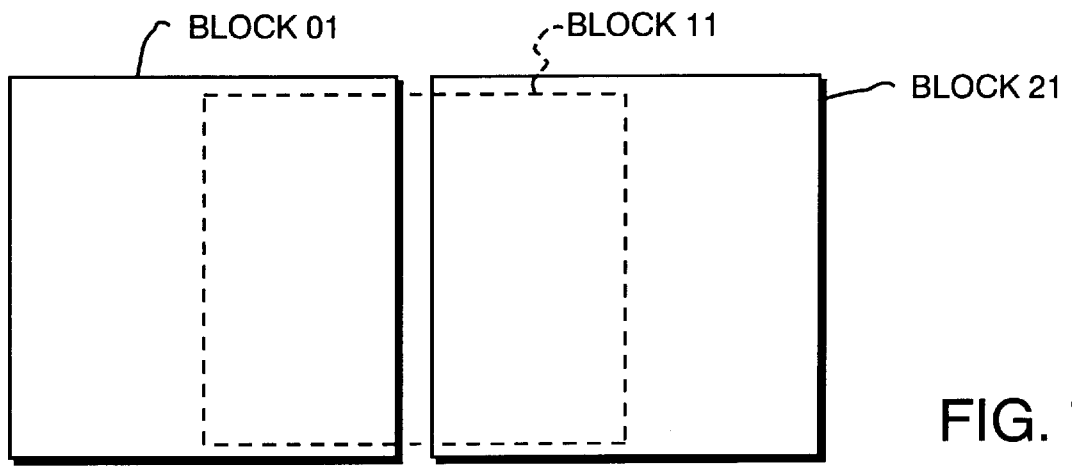
Figure 7C:
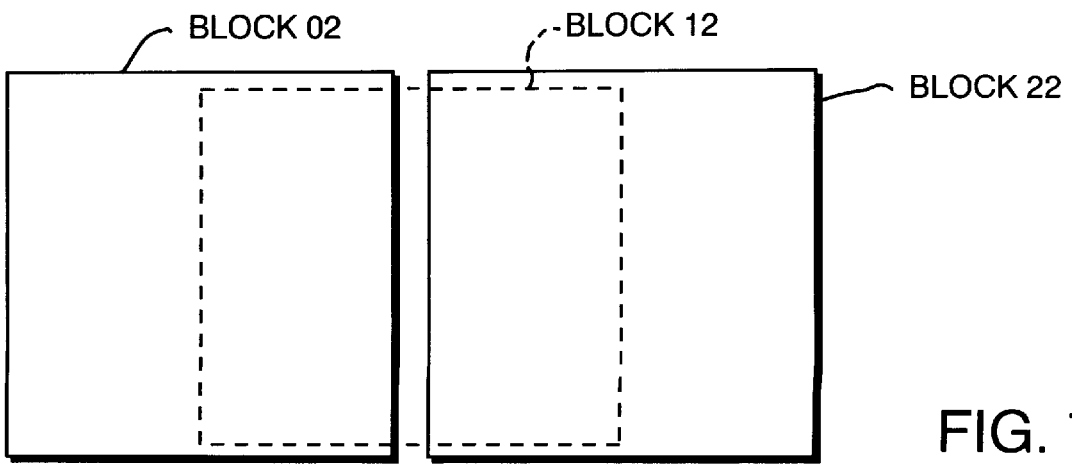
Figures 8A, 8B, 8C:
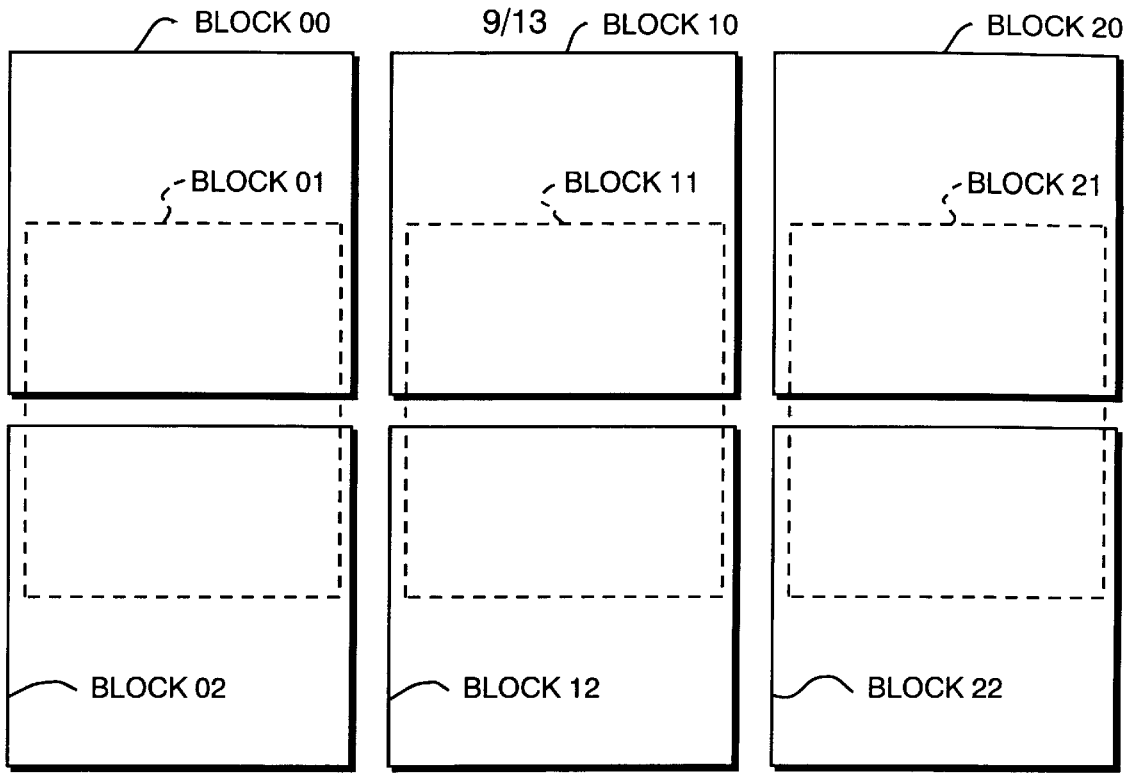
FIGS. 8A, 8B and 8C illustrate vertical overlapping of blocks from FIG. 6.

FIGS. 7A–7C illustrate the horizontal overlapping involved in the current example whereas FIGS. 8A–8C illustrate the vertical overlapping. FIG. 7A shows the horizontal overlapping of blocks 00, 10 and 20; FIG. 7B shows the horizontal overlapping of blocks 01, 11 and 21; and FIG. 7C shows the horizontal overlapping of blocks 02, 12 and 22. FIG. 8A shows the vertical overlapping of blocks 00, 01 and 02;

FIG. 8B shows the vertical overlapping of blocks 10, 11 and 12; and FIG. 8C shows the vertical overlapping of blocks 20, 21 and 22.

Figure 9:
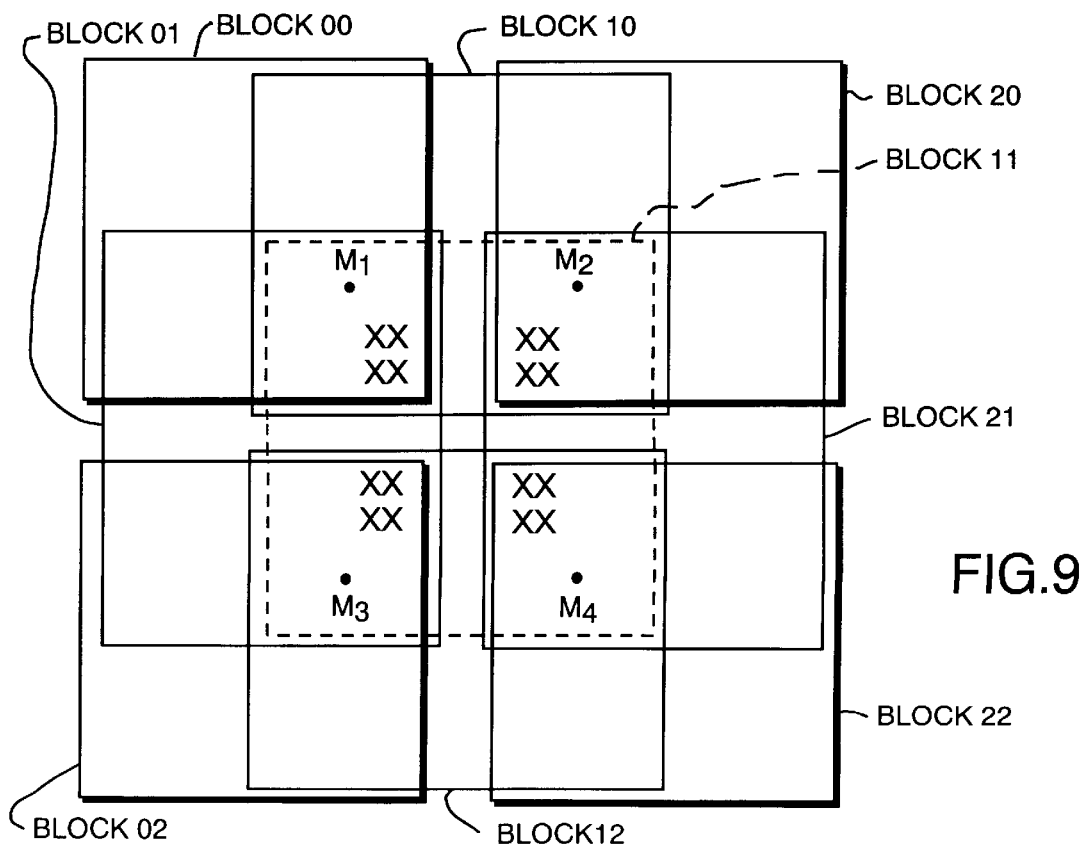
FIG. 9 illustrates overlapping of all the blocks of FIG. 6 in both the horizontal and vertical directions.

The complete overlapping scheme relating to block 11 is shown in FIG. 9. Note that the pixels located in the saved region are indicated by Xs. After processing is finished for block 11, the pixels in the saved region may be modified (i.e. corrected) to prevent blocking artifacts. The modification of these pixels will be explained hereafter.

Figure 10:
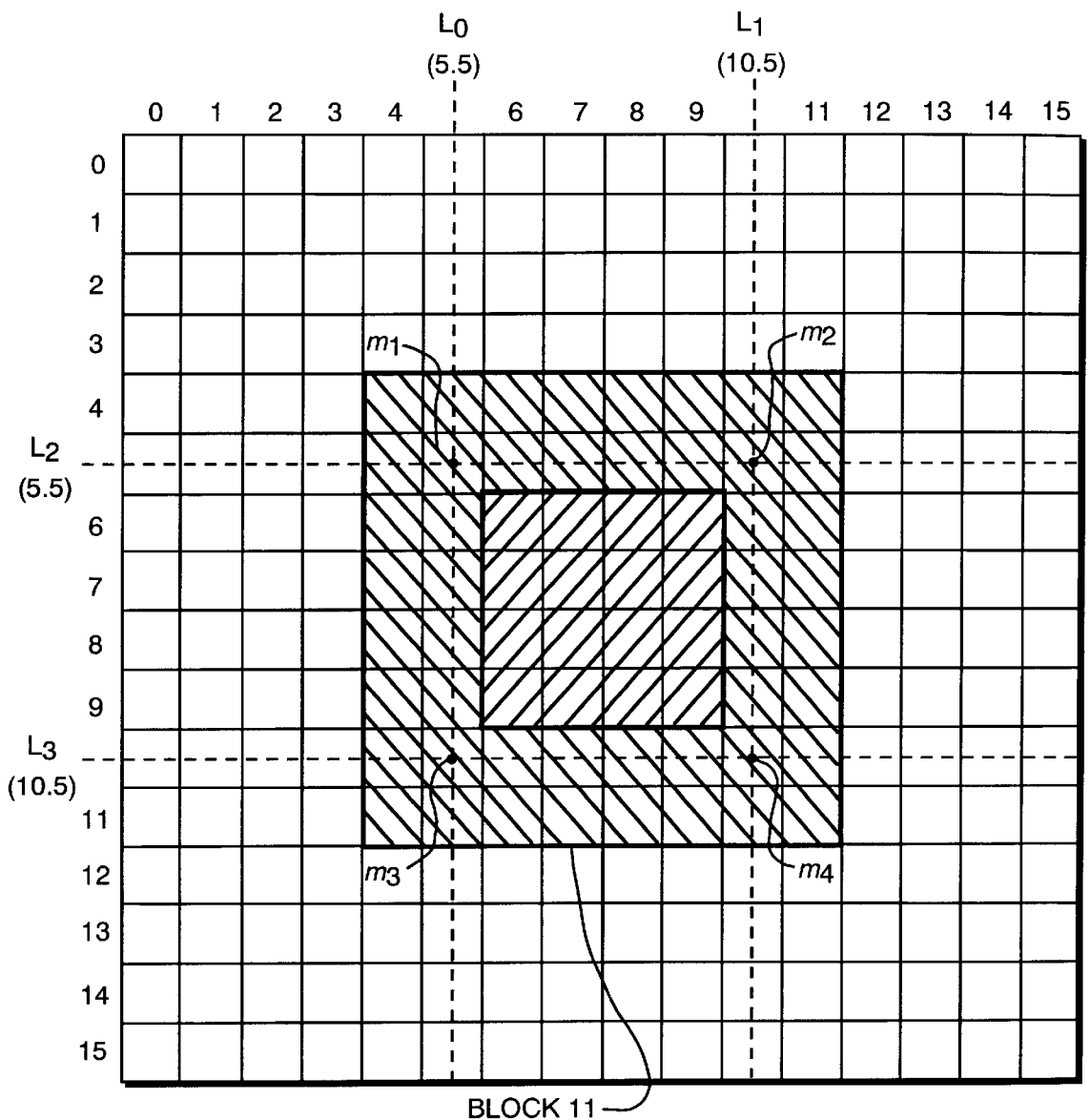
FIG. 10 is an expansion of the drawing of FIG. 5 showing the selected locations used with the inventive method.

Again turning to FIG. 1A, the stitching method 125 begins in step 112 where measurement points are chosen according to the amount of overlap desired. In the current two-dimensional example, the horizontal and vertical overlap are equal so that $k_h=k_v=4$. Of the 64 points in block 11, the central 16 points located at x={6, 7, 8, 9} and y={6, 7, 8, 9} will be saved. The two pixel wide perimeter of image data points will be discarded, i.e. points within block 11 that are not included within the saved region. As in the one-dimensional example, measurement points are chosen so that the corrections to measurement point values can be used to estimate the true pixel correction values corresponding to each pixel within the saved region. In this case (see FIG. 10), measurement point $m_1$ is chosen at {$L_0$, $L_1$}={5.5, 5.5}; measurement point $m_2$ is chosen at {$L_1$, $L_2$}={9.5, 5.5}; measurement point $m_3$ is chosen at {$L_0$, $L_3$}={5.5, 9.5}; and measurement point $m_4$ is chosen at {$L_1$, $L_3$}={9.5, 9.5}.

At each measurement point $m_1$, $m_2$, $m_3$ and $m_4$, four measurement point values are determined—one corresponding to each overlapped block having a common measurement point. This is due to the fact that four separate pixel blocks overlap each measurement point as can be determined from FIG. 9. Measurement point $m_1$ falls within the overlapped region of blocks 00, 10, 01 and 11 ; $m_2$ falls within the overlapped region of blocks 10, 20, 11 and 21; $m_3$ falls within the overlapped region of blocks 01, 11, 02 and 12; and $m_4$ falls within the overlapped region of blocks 11, 21, 12 and 22.

At measurement point $m_1$, four measurement point values $m_{1a}$, $m_{1b}$, $m_{1c}$ and $m_{1d}$ are determined from the intersection of $m_1$ with overlapped blocks 00, 10, 01 and 11, respectively, whereby the mean value at $m_1$ is represented as $M_1$. In other words, $$M_1 = \frac{m_{1a} + m_{1b} + m_{1c} + m_{1d}}{4}. \tag{2}$$

Similarly for measurement point $m_2$, the mean value $M_2=(m_{2a}+m_{2b}+m_{2c}+m_{2d})/4$; for measurement point $m_3$, the mean value $M_3=(m_{3a+m3b}+m_{3c}+m_{3d})/4$; and for measurement point $m_4$, the mean value $M_4=(m_{4a}+m_{4b}+m_{4c}+m_{4d})/4$. The four measurement point values each relate to one of the four overlapping 8×8 pixel blocks which affects that particular measurement point. Thus, for example, the mean value $M_1$ considers the effect of blocks 00, 10, 01 and 11 at measurement point $m_1$={$L_0$, $L_2$} (see FIGS. 9 and 10). Measurement point values are determined for all adjacent overlapping blocks at measurement points throughout the image.

The accumulation of measurement point values from all the blocks in the image can be arranged in corresponding arrays $|m_a|$, $|m_b|$, $|m_c|$ and $|m_d|$ where, for example, the array of mean values of all measurement points $m_1$ is represented as:

$$|M_1| = \frac{|m_{1a}| + |m_{1b}| + |m_{1c}| + |m_{1d}|}{4}, \tag{3}$$

where $|m_{1a}|$, $|m_{1b}|$, $|m_{1c}|$ and $|m_{1d}|$ are the arrays of all measurement point values relating to $m_1$ and $|M_1|$ is the array of all the mean values. Measurement point correction values $\delta_a$, $\delta_b$, $\delta_c$ and $\delta_d$ are next calculated in step 116 for each corresponding measurement point value $m_a$, $m_b$, $m_c$, $m_d$, respectively, at each measurement point.

The four measurement point correction values at $m_1$={$L_0$, $L_2$} are determined as $$\delta_{1a}=M_1-m_{1a} \tag{4}$$

$$\delta_{1b}=M_1-m_{1b} \tag{5}$$

$$\delta_{1c}=M_1-m_{1c} \tag{6}$$

$$\delta_{1d}=M_1-m_{1d} \tag{7}$$

The measurement point correction values at $m_2$={$L_1$, $L_2$}, $m_3$={$L_0$, $L_3$} and $m_4$={$L_1$, $L_3$} are similarly calculated. Of course, the above measurement point correction values of equations (4) through (7) can readily be written in matrix notation as understood by those skilled in the art.

Figure 11:
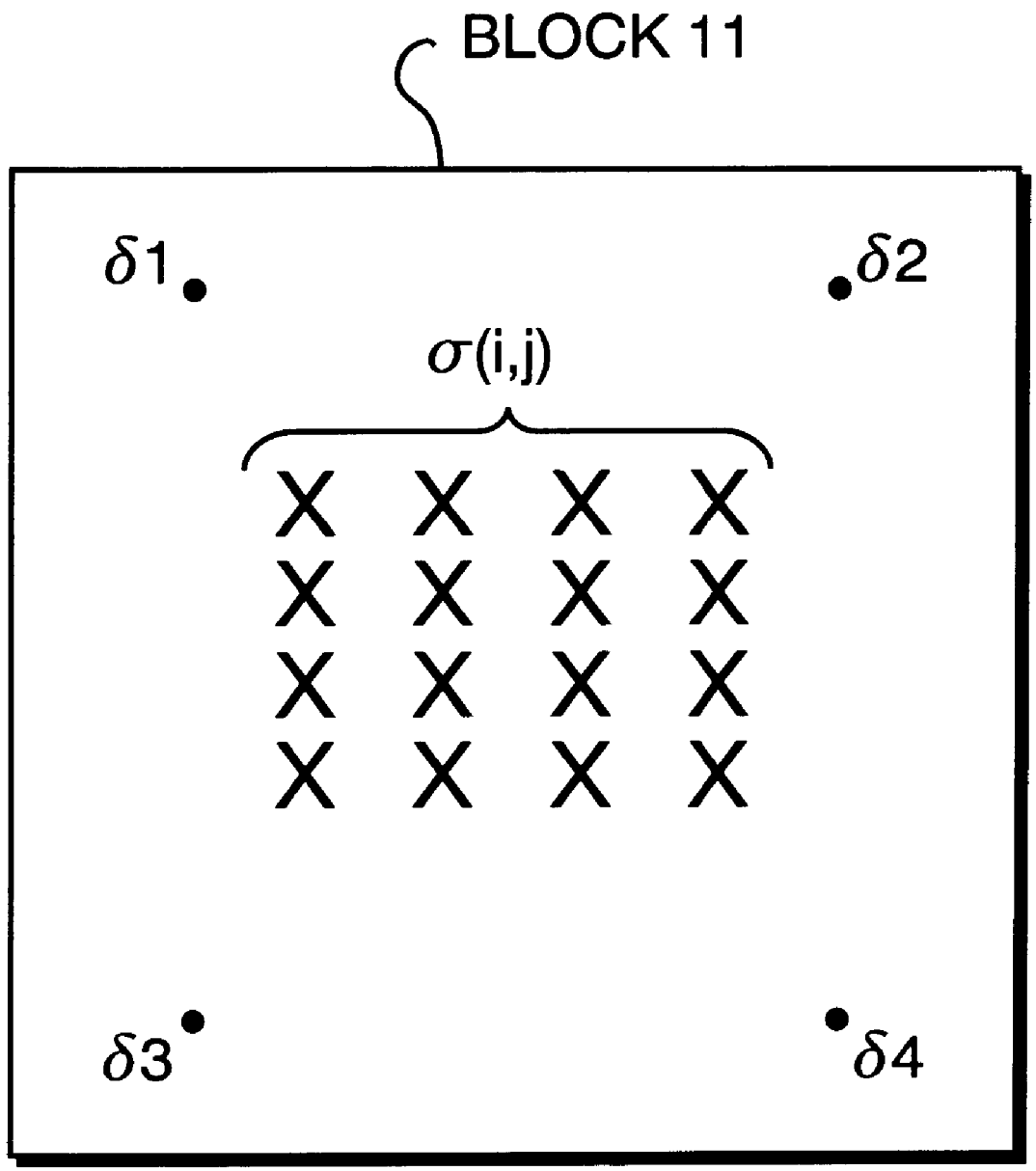
FIG. 11 is a graphical representation of the measurement point correction values and the true pixel correction values σ featured in an 8×8 point image segment labeled block 11.

After the various measurement point correction values (i.e. the δvalues) have been calculated, the true pixel correction values σ(i,j) corresponding to the pixels in the saved region of block 11 can be determined in step 118 by interpolation of the known measurement point correction values of equations (4) through (7). This is illustrated in FIG. 11 for block 11 where $\delta_1$, $\delta_2$, $\delta_3$, and $\delta_4$ are evaluated as previously described at measurement points $m_1$, $m_2$, $m_3$ and $m_4$, respectively, and the true pixel correction values σ(i,j) are evaluated for each pixel location in the saved region, i.e. at i={6, 7, 8, 9} and j={6, 7, 8, 9}. The true pixel correction values for each pixel in the saved region (marked by Xs) of block 11, are evaluated in a like manner as earlier described for the one-dimensional example. These true pixel correction values σ(i,j) are, respectively, added in step 120 to the IDCT coefficients of pixels in the saved region so that the processed image can be viewed or otherwise displayed without any blocking artifacts.

As earlier mentioned, the inventive stitching method for removing or at least minimizing blocking artifacts in a filtered image can occur in either the spatial or the frequency domain. Specifically, the inputs and the outputs for processing can reside in either the spatial or frequency domain. For instance, a spatial domain input can result in either a spatial or frequency domain output, and a frequency domain input can also result in either a spatial or frequency domain output.

The size of the blocks, the amount of overlap between adjacent blocks, and the indexing of pixels within the blocks can all be varied to conform with acceptable design and application requirements. For instance, the four selected locations of measurement points for the above two-dimensional example can be universally translated to apply to any 8×8 block in the image where $m_1=\{1.5, 1.5\}$, $m_2=\{5.5, 1.5\}$, $m_3=\{1.5, 5.5\}$, and $m_4=\{5.5, 5.5\}$, given x and y evaluated at integer values from 0 to 7 for each block.

Figure 12A:
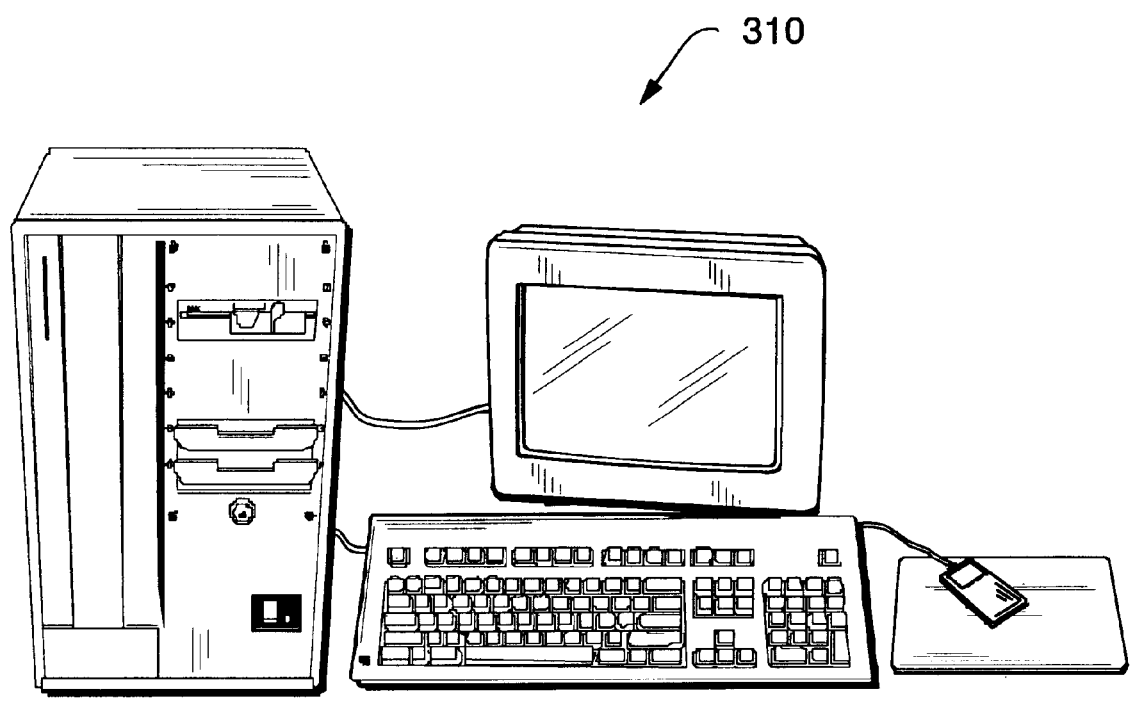
FIG. 12A is an illustration of a general purpose computer used to implement the inventive stitching method of FIGS. 1A and 1B programmed therein.
Figure 12B:
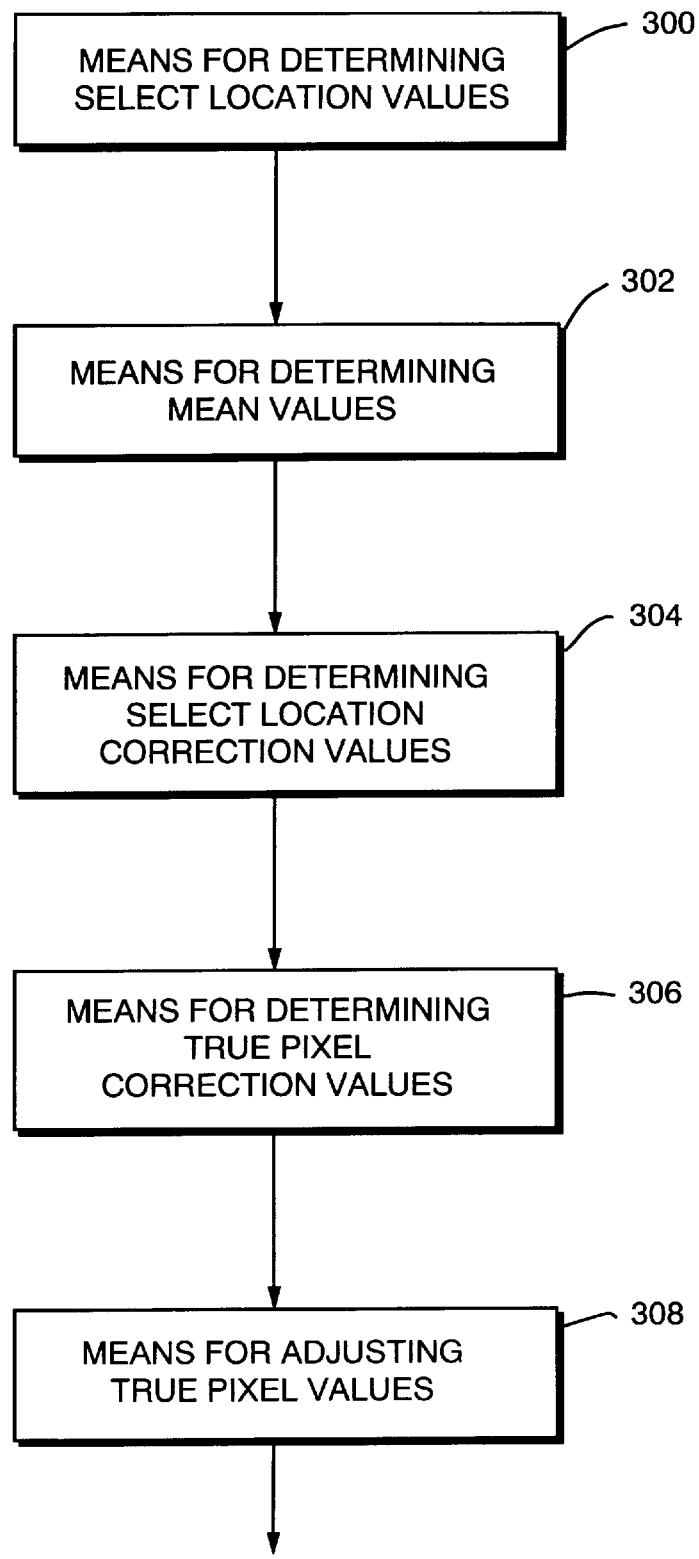
FIG. 12B is a block diagram of selected parts of the system of FIG. 12A necessary to implement the stitching method.

One workable system for implementing the above stitching method is a general purpose computer 310 as shown in FIG. 12A. Selected parts of the computer 310, necessary for programming the stitching method into the computer, are shown in FIG. 12B to include: means for determining measurement point values 300; means for determining mean values 302; means for determining measurement point correction values 304; means for determining true pixel correction values 306; and means for adjusting true pixel values 308. The determination of measurement points can be made manually, by operator input, or automatically according to software requirements for a specific application. Each of the components shown in FIG. 12B could, for instance, be resident in the central processing unit of the computer.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. A method for minimizing blocking artifacts which appear in an image comprising the steps of;
   providing said image being represented as a plurality of adjacent, overlapping blocks of pixels, said blocks having been separately filtered by a predetermined number of different filters;
   choosing measurement points so that said adjacent blocks have at least one of said measurement points in common. wherein said measurement points are chosen to fall between said pixels or on said pixels;
   determining measurement point values at two or more of said measurement points within each said block;
   determining measurement point correction values based on said determined measurement point values at each said measurement point for each said adjacent block;
   determining true pixel correction values for preselected pixels of each said block by interpolation from said measurement point correction values; and
   mininmizing said blocking artifacts by adjusting said pixels of said block by said true pixel correction values, wherein all of said steps occur entirely in a spatial domain or a frequency domain.

2. The method of claim 1, wherein said blocks comprise 8×8 pixels overlapped by four pixels.

3. The method of claim 1, where said preselected pixels comprise a predetermined saved region.

4. The method of claim 1, wherein said preselected pixels comprise every pixel of each said block.

5. The method of claim 1 wherein said measurement point values are determined by direct measurement.

6. The method of claim 1 wherein said measurement values are determined by approximation from surrounding pixels.

7. A system for minimizing blocking artifacts which appear in an image comprising:
   means for providing said image being represented as a plurality of adjacent, overlapping blocks of pixels, said blocks having been separately filtered by a predetermined number of different filters;
   means for choosing measurement points so that said adjacent blocks have at least one of said measurement points in common, wherein said measurement points are chosen to fall between said pixels or on said pixels;
   means for determining measurement point values at two or more of said measurement points within each said block;
   means for determining measurement point correction values based on said determined measurement point values at each said measurement point for each said adjacent block;
   means for determining true pixel correction values for preselected pixels of each said block by interpolation from said measureent point correction values; and
   means for minimizing said blocking artifacts by adjusting said pixels of said block by said true pixel correction values, wherein all of said means of the system operate entirely in a spatial domain or a frequency domain.

8. The system of claim 7, wherein said blocks comprise 8×8 pixels overlapped by four pixels.

9. The system of claim 7, where said preselected pixels comprise a predetermined saved region.

10. The system of claim 7, wherein said preselected pixels comprise every pixel of each said block.

11. The system of claim 7 wherein said measurement point values are determined by direct measurement.

12. The system of claim 7 wherein said measurement values are determined by approximation from surrounding pixels.

13. A method for minimizing blocking artifacts introduced into a digital image comprising the steps of:
   processing said image as a series of overlapped, filtered adjacent blocks of pixels;
   choosing common measurement points within said overlapped regions of the contiguous sides of adjacent blocks;
   determining measurement point values at said common measurement points for all said overlapped regions, wherein said measurement points are chosen to fall between said pixels or on said pixels;
   detemining measurement point correction values based on said determined measurement point values corresponding to each said measurement point;
   determining true pixel correction values by interpolation from said measurement point correction values; and
   minimizing said blocking artifacts by adjusting said pixels of said block by said true pixel correction values, wherein all of said steps occur entirely in a spatial domain or a frequency domain.

14. The method of claim 13, wherein said blocks comprise 8×8 pixels overlapped by four pixels.

* * * * *